Dec. 7, 1965 J. H. MARSHALL 3,222,207
PROCESS OF PRODUCING METALLIC DEPOSITS
Filed Oct. 6, 1961
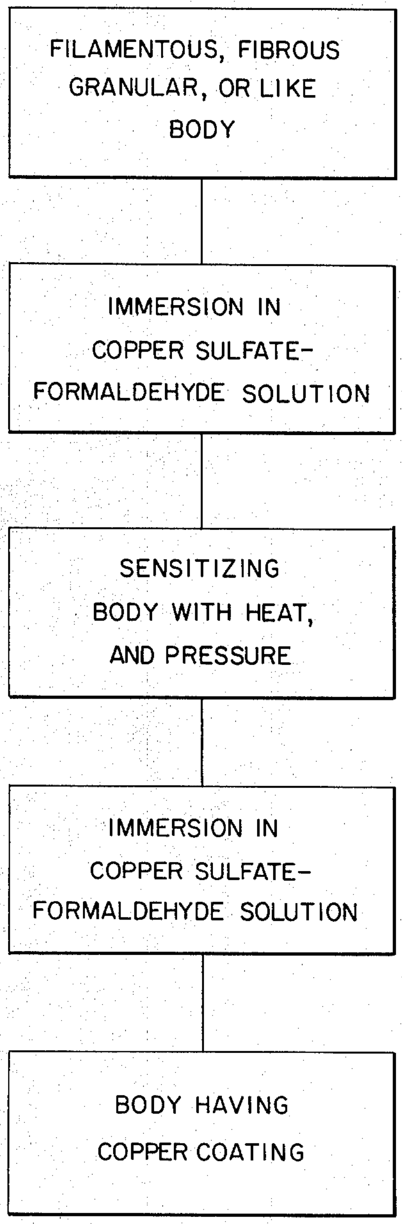
INVENTOR
JOHN H. MARSHALL United States Patent Office 3,222,207

Patented Dec. 7, 1965

3,222,207
PROCESS OF PRODUCING METALLIC DEPOSITS

John H. Marshall, Tivoli, N.Y., assignor to International Business Machines Corporation, New York, N.Y., a corporation of New York Filed Oct. 6, 1961, Ser. No. 143,289
6 Claims. (Cl. 117—47)

This invention relates to the metallizing of surfaces and, in particular, to the electroless depositing of copper on nonconductive bodies having filamentous, fibrous, granular or the like structure.

In the metallization of nonconductive bodies, it is important to ensure the receptivity of the surface for the metal to be deposited thereon. The usual method for doing this is to immerse the surface to be plated in a solution which produces a nuclei of reductive ions in the pores of the substance, accelerating the formation of the metal coating and its adhesion to the nonconductive body. This is followed by further treatment in a solution which acts in the nature of a catalyst to the actual formation of the metal film on the surface of the nonconductive body. The sequence of treatments sensitizes the surface of the nonconductive body and provides the surface with a receptivity for copper atoms.

Although the prior art methods for sensitizing a surface, by immersion in two solutions as heretofore described, provide a surface with a receptivity for copper, they have disadvantages. The prior art sensitizing treatments require at least two solutions, and, in addition, a copper film deposited on a surface will contain metallic ions from each of the sensitizing solutions. Other methods for placing copper on a nonconductive surface, such as pressing cooper sheets or spraying copper particles onto a surface, have further disadvantages. These techniques produce an uneven distribution of metallic particles which affect the uniformity and appearance of the metal film. In applications where electrical conductivity is important the formation of these particles and foreign ions must be minimized.

Accordingly, it is the primary object of this invention to provide an improved method for electrolessly depositing copper on the surface of a body.

It is further the object of this invention to provide an electrolessly deposited copper layer having improved properties.

It is a still further object of this invention to provide an economical and efficient process for electrolessly depositing copper on a nonconductive body.

According to the invention, a nonconductive body is exposed to an alkaline copper solution, reducible by formaldehyde in the presence of heat to metallic copper. Heat and pressure are applied to reduce the copper salts on the surface thereof to partially reduce oxides and hydroxides of copper. The surface of the body is again exposed to the copper solution as before and a layer of copper produced thereon. The invention provides a copper layer with superior properties from the standpoint of adhesion, hardness, tarnish resistance and electrical conductivity.

The foregoing and other objects, features and advantages of the invention will be apparent from the following more particular description of preferred embodiments of the invention.

The drawing is a flow diagram which illustrates the steps of the invention.

More specifically, in accordance with the invention, a copper layer is deposited on the surface of a nonconductive body by: sensitizing the surface of the body with a reducible copper solution, heating the sensitized surface under pressure to reduce the soluble copper salts to oxides and hydroxides, and forming a copper layer on the surface of the body by again immersing the surface in the reducible copper solution. The reducible copper solution has a pH between 10.5 to 13.0 and comprises: 1 to 15% by weight copper sulfate; one member selected from the group consisting of 0.5 to 2% by weight glycerine, 10 to 20% by weight lactic acid, 20 to 35% by weight citric acid and 10 to 15% by weight sodium-potassium tartrate (Rochelle salts); 1 to 25% by weight sodium hydroxide; 0.9 to 9.4% by weight formalin or formaldehyde forming salts; and, the balance water.

The following are illustrative examples of particular reducible copper solutions in accordance with the present invention. All examples contain between 0.9 to 9.4% by weight formalin and all quantities are expressed per liter of water.

*Example I*

| | Grams |
|---|---|
| Copper sulfate | 10 to 20 |
| Glycerine | 5 to 20 |
| Sodium hydroxide | 10 to 50 |

*Example II*

| | |
|---|---|
| Copper sulfate | 100 to 150 |
| Lactic acid | 150 to 200 |
| Sodium hydroxide | 100 to 150 |

*Example III*

| | |
|---|---|
| Copper sulfate | 100 to 150 |
| Citric acid | 250 to 350 |
| Sodium hydroxide | 200 to 250 |

*Example IV*

| | |
|---|---|
| Copper sulfate | 100 to 150 |
| (Rochelle salts) Sodium-potassium tartrate | 100 to 150 |
| Sodium hydroxide | 25 to 35 |

Although in general the reducible copper solution, in accordance with the present invention, has a composition within the range described above, the reducible copper solution for a preferred embodiment of the present invention comprises 1% by weight copper sulfate, 1% by weight glycerine, 2% by weight of sodium hydroxide, 2.8–3.7% by weight of formalin (37%) and the balance water. To produce a reducible copper solution of the preferred embodiment, 10 grams of copper sulfate and glycerine are dissovled in 500 cc. water. Twenty grams of sodium hydroxide is dissolved in 200 cc. of water and added to the 500 cc. of water containing the copper sulfate and glycerine. Water is then added to the solution to make a total of 1000 cc. Thereafter, 30 to 40 cc. of formalin (37%) is added to the solution which is now ready for use. The glycerine solution is preferred in that it is more stable than the others.

A copper layer is deposited on a paper card, for example, in accordance with the invention by sensitizing the card by immersing the surface thereof in the reducible copper solution for one minute at room temperature. After sensitizing, the excess solution is removed from the paper by blowing, air drying, or by oven drying at a temperature between 125 to 150° F. Any temperature which will not char the fibers may be used. The impregnated card is then placed between heated platens or rollers maintained at a temperature in the range of 150–250° F. and a pressure in the range of 500 to 1000 p.s.i. is applied for about one minute. The heating under pressure causes the soluble salts to reduce to partially reduced oxides and hydroxides of copper. Copper is then deposited on the paper by again immersing the card in the reducible copper solution for a period between 5 to 10 minutes. The card may be warmed which will hasten the reaction. The procedure produces uniform, homogeneous, non-blotchy, nonporous and bright copper layers firmly adherent to the surface of the nonconductive body. This is accomplished without the use of special presensitizing solutions as is required in the prior art procedures. Furthermore, the invention provides a copper layer on any filamentous, fibrous, granular or like structure—whether organic or inorganic, plastic, glass, paper or the like material.

While the invention has been particularly shown and described with reference to preferred embodiments thereof, it will be understood by those skilled in the art that the foregoing and other changes in form and detail may be made therein without departing from the spirit and scope of the invention.

I claim:

1. A process for electrolessly depositing copper on a nonconductive filamentous, fibrous, granular or like body by the steps of:

immersing said body in a reducible copper sulfate solution, said solution comprising: 1 to 15% by weight copper sulfate; one member selected from the group consisting of 0.5 to 2% by weight glycerine, 10 to 20% by weight lactic acid, 20 to 35% by weight citric acid and 10 to 15% by weight sodium-potassium tartrate; 1 to 25% by weight sodium hydroxide; 0.9 to 9.4% by weight formalin and the balance water;

removing said body from said solution and heating said body to a temperature sufficient to reduce substantial portions of said sensitizing solution while simultaneously maintaining said body under pressure sufficient to maintain the physical configuration of said body free from deformation; and, reimmersing said body in said reducible copper sulfate solution to deposit a layer of copper thereon.

2. A process for electrolessly depositing copper on the surface of a nonconductive filamentous, fibrous, granular or like body by the steps of:

immersing said surface in a reducible copper sulfate solution, said solution comprising 1 to 15% by weight copper sulfate; one member selected from the group consisting of 0.5 to 2% by weight glycerine, 10 to 20% by weight lactic acid, 20 to 35% by weight citric acid and 10 to 15% by weight sodium-potassium tartrate; 1 to 25% by weight sodium hydroxide, 0.9 to 9.4% by weight formalin and the balance water;

removing said body from said solution and heating said immersed surface to a temperature between 150° F. to 250° F. while under a pressure in range between 500 to 1000 p.s.i.; and, reimmersing said surface in said reducible copper sulfate solution to deposit a copper layer thereon.

3. A process for electrolessly depositing copper on the surface of a nonconductive filamentous, fibrous, granular or like body by the steps of:

immersing said surface in a reducible copper sulfate solution, said solution comprising 1 to 15% by weight copper sulfate; one member selected from the group consisting of 0.5 to 2% by weight glycerine, 10 to 20% by weight lactic acid, 20 to 35% by weight citric acid and 10 to 15% by weight sodium-potassium tartrate; 1 to 25% by weight sodium hydroxide; 0.9 to 9.4% by weight formalin and the balance water;

removing said body from said solution and heating said surface to a temperature between 150° F. to 250° F. under a pressure in the range between 500 to 1000 p.s.i.; and, reimmersing said surface in said reducible copper sulfate solution for a period of 5 to 10 minutes to deposit a copper layer thereon.

4. A process for electrolessly depositing a copper layer on a surface of a nonconductive filamentous, fibrous, granular or like body by the steps of:

immersing said surface in a reducible copper sulfate solution, said solution comprising 1% by weight copper sulfate, 1% by weight glycerine, 2% by weight sodium hydroxide, 2.8 to 3.7% by weight formalin and the balance water;

removing said body from said solution and heating said body to a temperature sufficient to reduce substantial portions of said sensitizing solution while simultaneously maintaining said body under pressure sufficient to maintain the physical configuration of said body free from deformation; and, reimmersing said surface in said reducible copper sulfate solution to deposit copper thereon.

5. A process for electrolessly depositing copper on the surface of a nonconductive filamentous, fibrous, granular or like body by the steps of:

immersing said surface in a reducible copper sulfate solution, said solution comprising 1% by weight copper sulfate, 1% by weight glycerine, 2% by weight sodium hydroxide, 2.8 to 3.7% by weight formalin and the balance water;

removing said body from said solution and heating said surface to a temperature between 150° F. to 250° F. under a pressure in the range between 500 to 1000 p.s.i.; and, reimmersing said surface in said copper sulfate solution to deposit a copper layer thereon.

6. A process for electrolessly depositing copper on a nonconductive filamentous, fibrous, granular or like body by the steps of:

impregnating said body with an alkaline copper solution containing formaldehyde which is substantially stable at the ambient temperature of sensitization and which will substantially reduce to one or more of the group consisting of copper oxides and copper hydroxides at temperatures substantially elevated above said ambient temperature;

heating said impregnated body to a temperature sufficient to reduce substantial portions of said sensitizing solution while simultaneously maintaining said body under pressure sufficient to maintain the physical configuration of said body free from deformation; and immersing said body in said alkaline copper solution containing formaldehyde to form a copper layer thereon.

References Cited by the Examiner

UNITED STATES PATENTS

| | | | |
|---|---|---|---|
| 2,643,199 | 6/1953 | Hersch | 117—160 X |
| 2,938,805 | 5/1960 | Agens | 17—130 X |
| 2,996,408 | 8/1961 | Lukes | 117—160 X |

OTHER REFERENCES

Narcus: Metallizing of Plastics, p. 31, Reinhold, New York, 1960.

WILLIAM D. MARTIN, *Primary Examiner.*

RICHARD D. NEVIUS, *Examiner.*